Jan. 21, 1958  G. F. KEELERIC  2,820,746
METHOD OF MAKING AN ABRASIVE TOOL
Filed Nov. 25, 1953  9 Sheets-Sheet 1

Jan. 21, 1958 G. F. KEELERIC 2,820,746
METHOD OF MAKING AN ABRASIVE TOOL
Filed Nov. 25, 1953 9 Sheets-Sheet 2

Inventor:
George F. Keeleric
By Lynn A. Williams
Attorney.

Jan. 21, 1958  G. F. KEELERIC  2,820,746
METHOD OF MAKING AN ABRASIVE TOOL
Filed Nov. 25, 1953  9 Sheets-Sheet 3

Inventor:
George F. Keeleric
By Lynn A. Williams
Attorney.

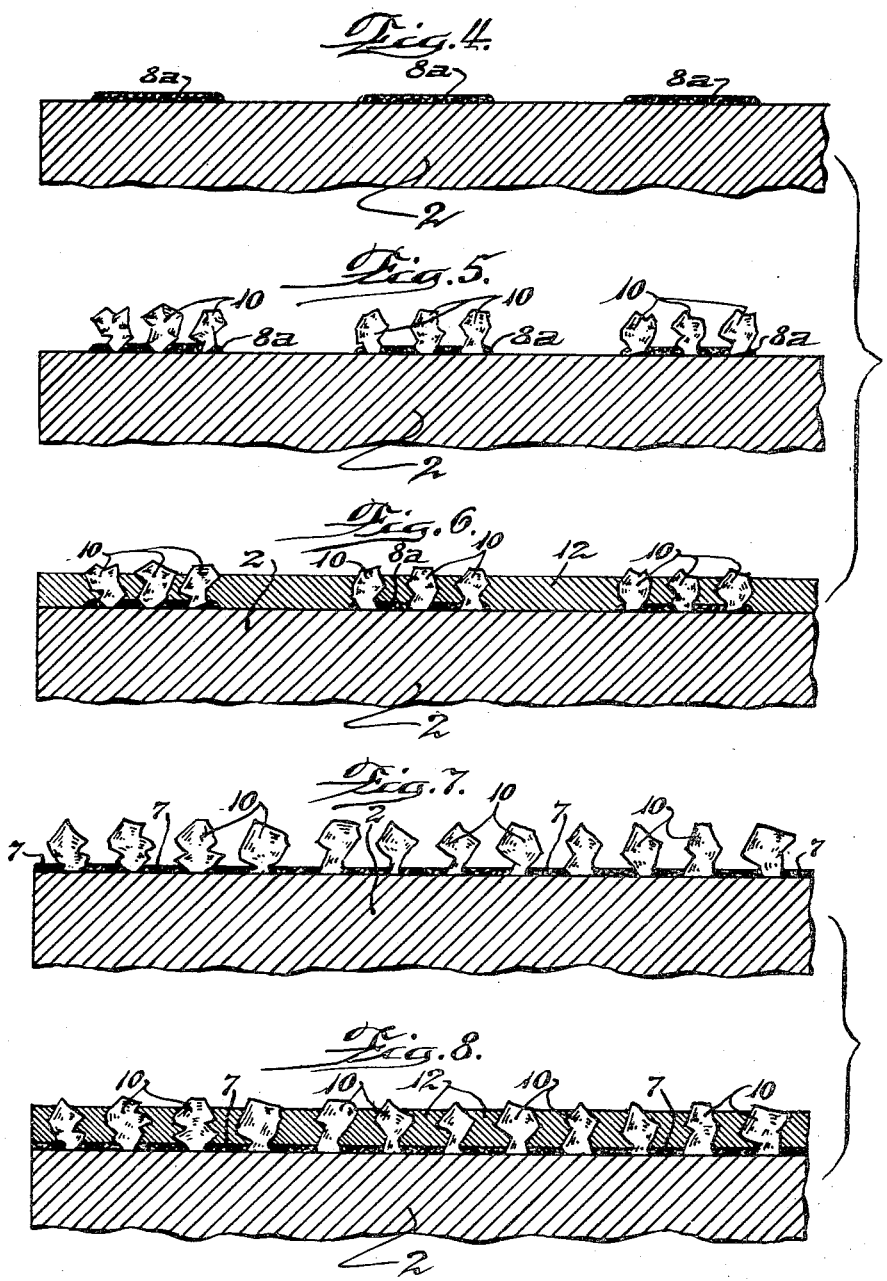

Jan. 21, 1958  G. F. KEELERIC  2,820,746
METHOD OF MAKING AN ABRASIVE TOOL
Filed Nov. 25, 1953  9 Sheets-Sheet 5
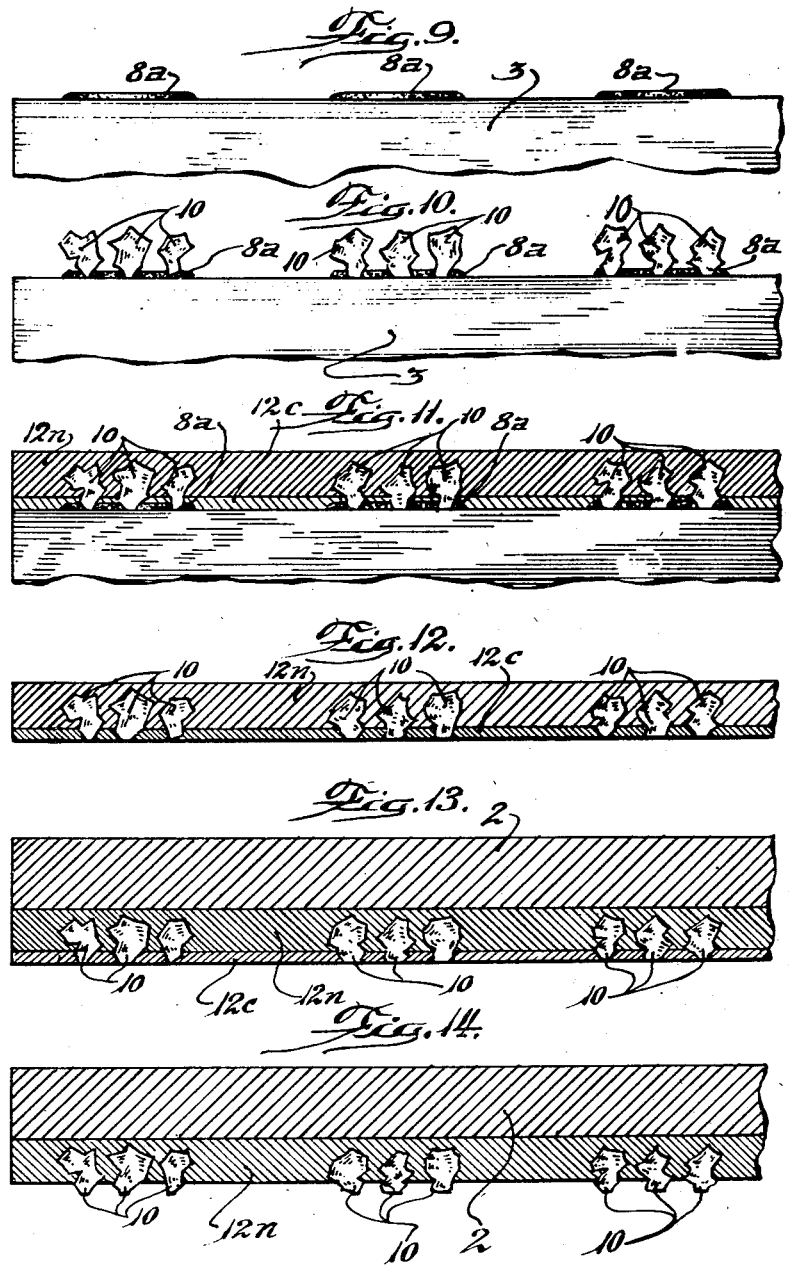

Jan. 21, 1958 G. F. KEELERIC 2,820,746
METHOD OF MAKING AN ABRASIVE TOOL
Filed Nov. 25, 1953 9 Sheets-Sheet 6
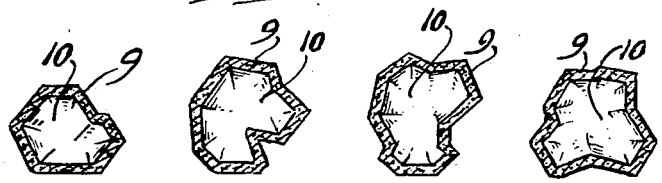
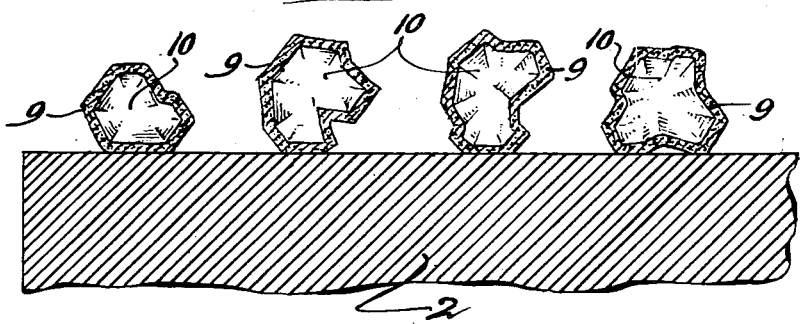
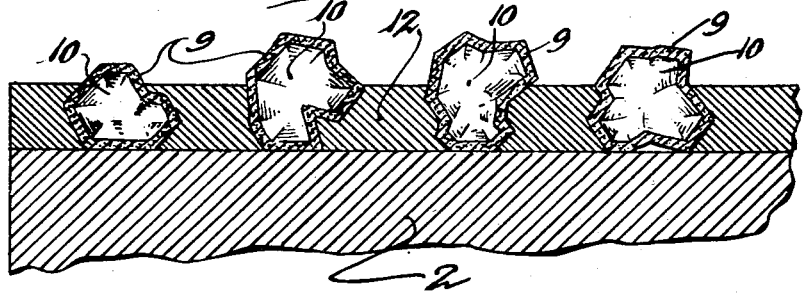
Inventor:
George F. Keeleric
By Lynn A. Williams
Attorney.

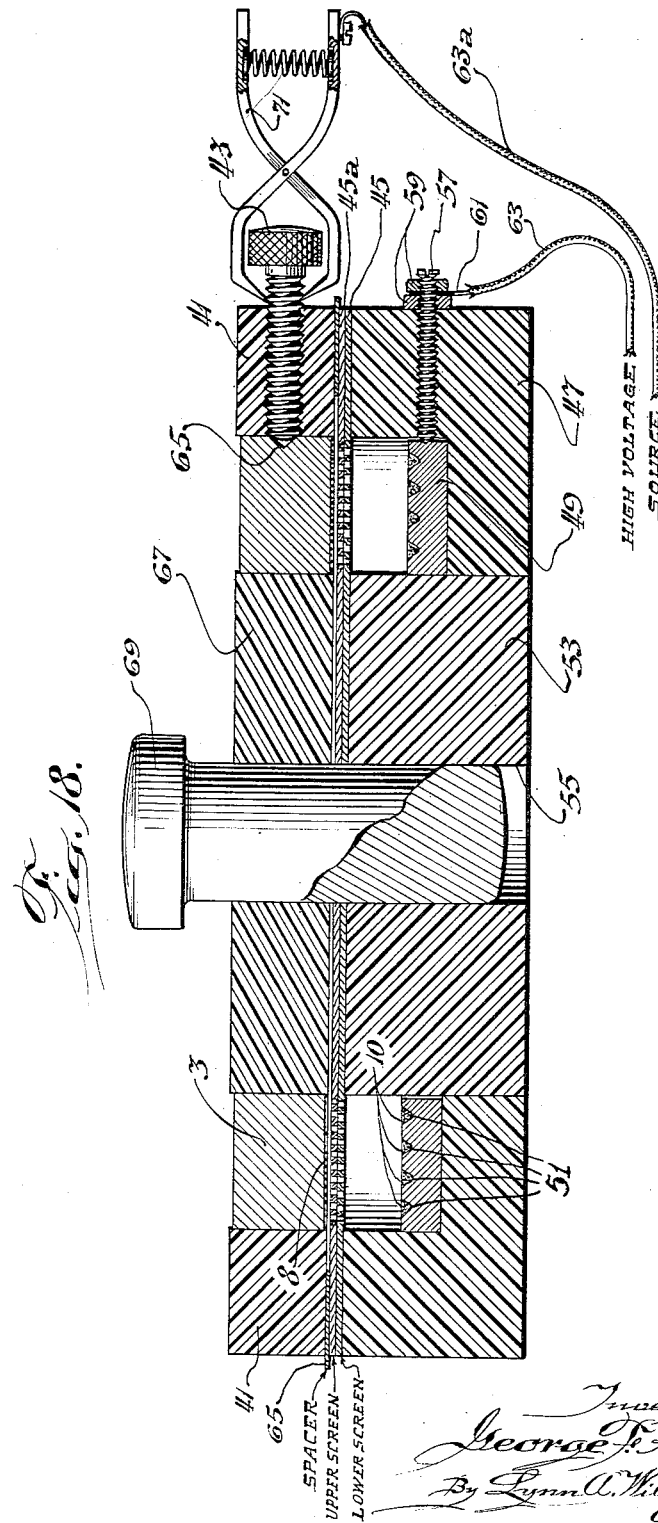

Jan. 21, 1958   G. F. KEELERIC   2,820,746
METHOD OF MAKING AN ABRASIVE TOOL
Filed Nov. 25, 1953   9 Sheets-Sheet 8

INVENTOR:
George F. Keeleric
BY Lynn A. Williams
Attorney.

Jan. 21, 1958 G. F. KEELERIC 2,820,746
METHOD OF MAKING AN ABRASIVE TOOL
Filed Nov. 25, 1953 9 Sheets-Sheet 9

INVENTOR:
George F. Keeleric
BY Lynn A. Williams,
Attorneys.

United States Patent Office 2,820,746
Patented Jan. 21, 1958

2,820,746

METHOD OF MAKING AN ABRASIVE TOOL

George F. Keeleric, Dundee, Ill.

Application November 25, 1953, Serial No. 394,348

2 Claims. (Cl. 204—16)

This invention relates to abrasive tools and methods of making them.

This application is a continuation in part of my prior application, Serial No. 357,483, filed May 26, 1953.

A part of the invention resides in the discovery that determinate arrangements or patterns of abrasive particles in an abrasive tool will produce improved results. Such improved results may appear in faster removal rates, better and more uniform finish, longer tool life, better clearing of chips or detritus, the ability to impart a determinate cutting pattern on the work or in combinations of these results. Different patterns may be selected for different kinds of applications.

Accordingly, one of the objects of this invention is to produce an abrasive tool of determinate pattern or arrangement of the abrasive particles in it.

Another object is to provide a method of making abrasive tools by which a wide range of determinate particle arrangements may be obtained at reasonable cost and as a practical production technique.

Another object is to provide an abrasive tool in which the number of abrasive particles is greater wherever greatest wear is normally encountered, as, for example, toward any edge of the tool over which a workpiece normally enters or leaves the working area of the tool.

Another object is to provide an abrasive tool in which abrasive particles are held in place by a combination of resin or plastic bond and metal bond.

A related object is to provide a method of making an inexpensive, single-layer abrasive tool.

Other objects will appear in the description of the invention which follows.

Figure 3:
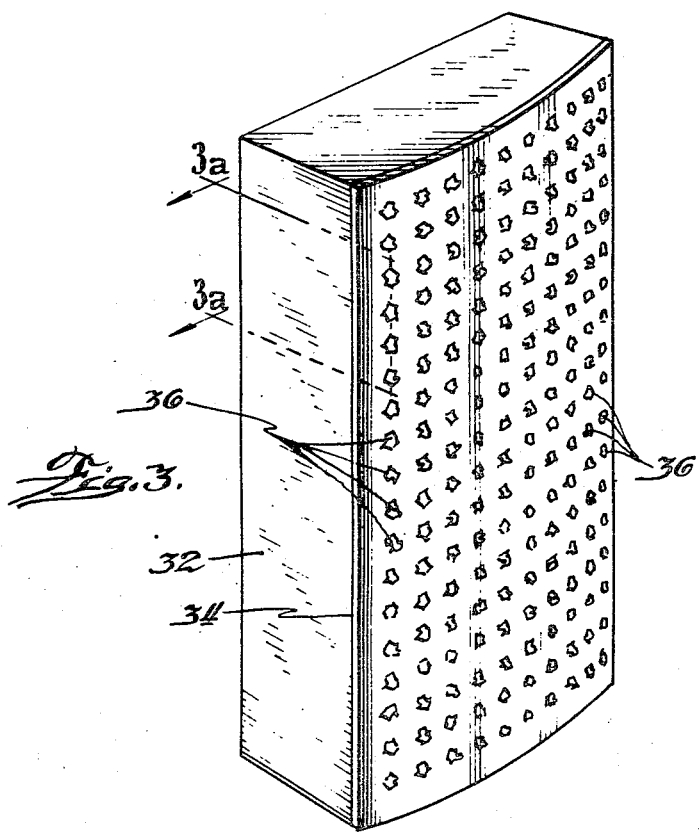
Fig. 3 is a perspective view showing a honing tool made according to this invention.
Figure 3A:
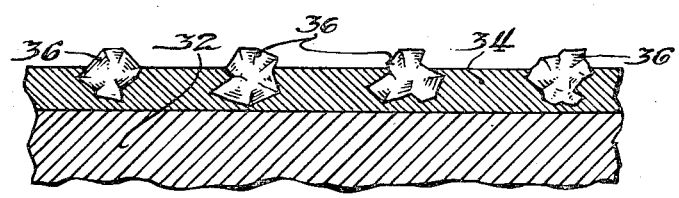

Fig. 3-A shows a fragmentary section of the honing tool of Fig. 3 taken along the plane of 3a—3a.

Figs. 4, 5 and 6 show steps in the manufacture of an abrasive tool according to this invention. Each is the same fragmentary sectional view.

Figs. 7 and 8 show steps in a modified mode of manufacture of abrasive tools according to this invention. Each is the same fragmentary sectional view.

Figs. 9 to 14, inclusive, show steps in another mode of manufacture of abrasive tools according to this invention. Each is the same fragmentary sectional view except that Figs. 9, 10 and 11 are partly in elevation.

Figs. 15, 16 and 17 show steps in a variant method of manufacturing abrasive tools according to this invention. Figs. 16 and 17 are partly in section.

Fig. 18 is a sectional view of apparatus used in an alternative method of making abrasive tools according to this invention.

Figure 19:
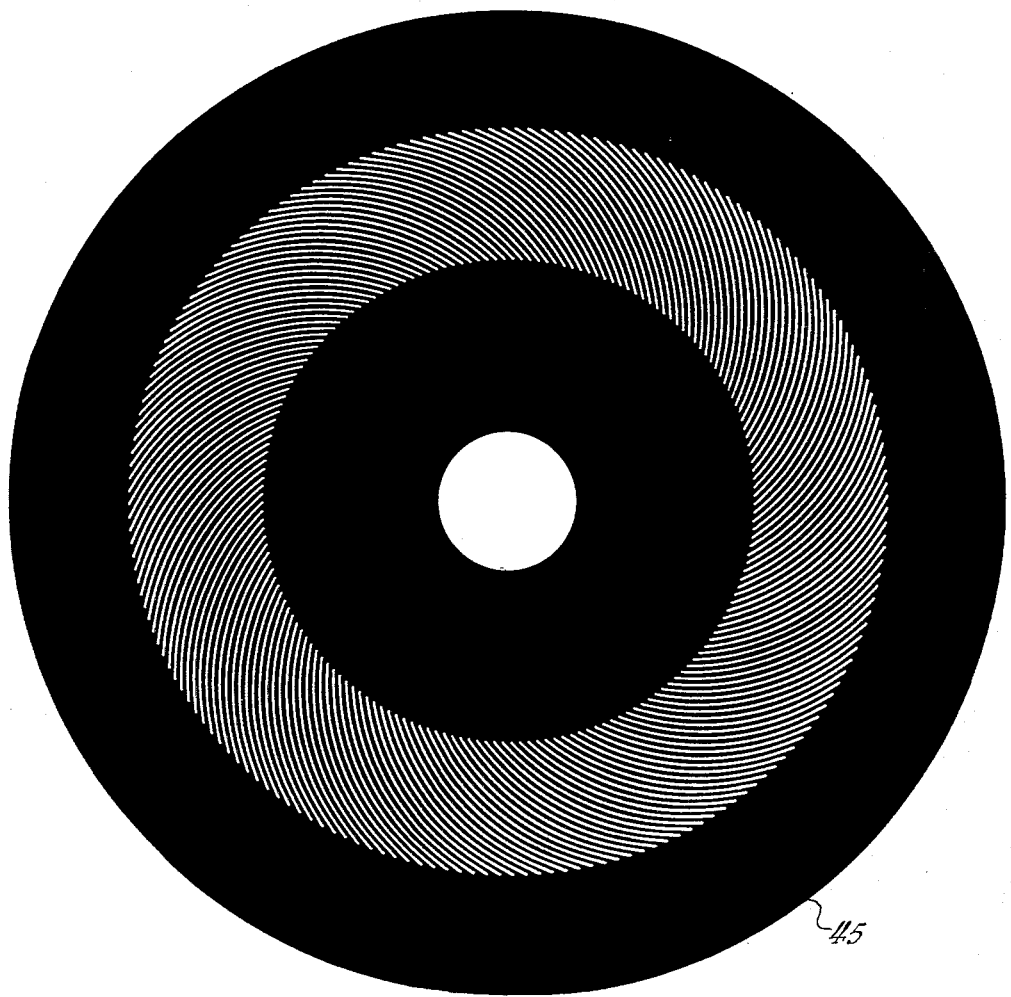

Fig. 19 is a partially retouched photograph of a screen used in the apparatus of Fig. 18.

Figure 20:
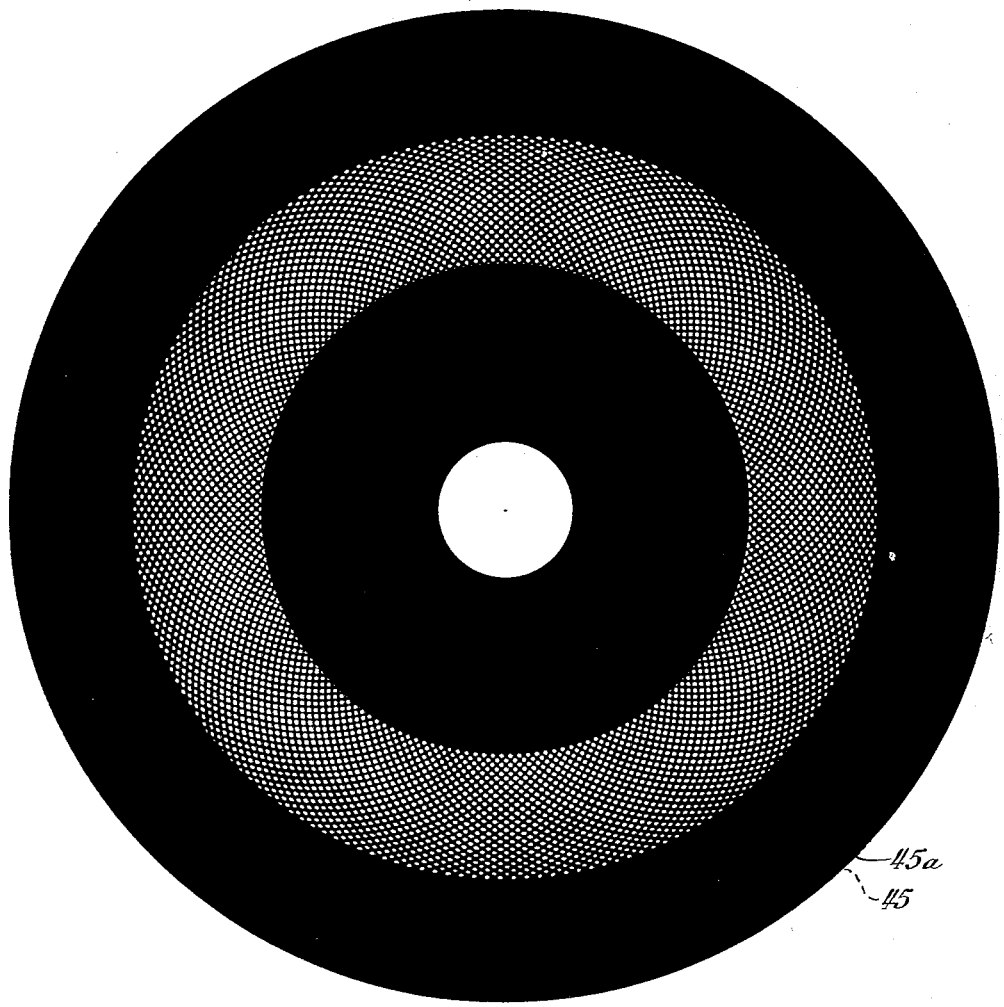

Fig. 20 is a partially retouched photograph of a pair of screens like that of Fig. 19 mounted together to form a cross pattern.

Figure 1:
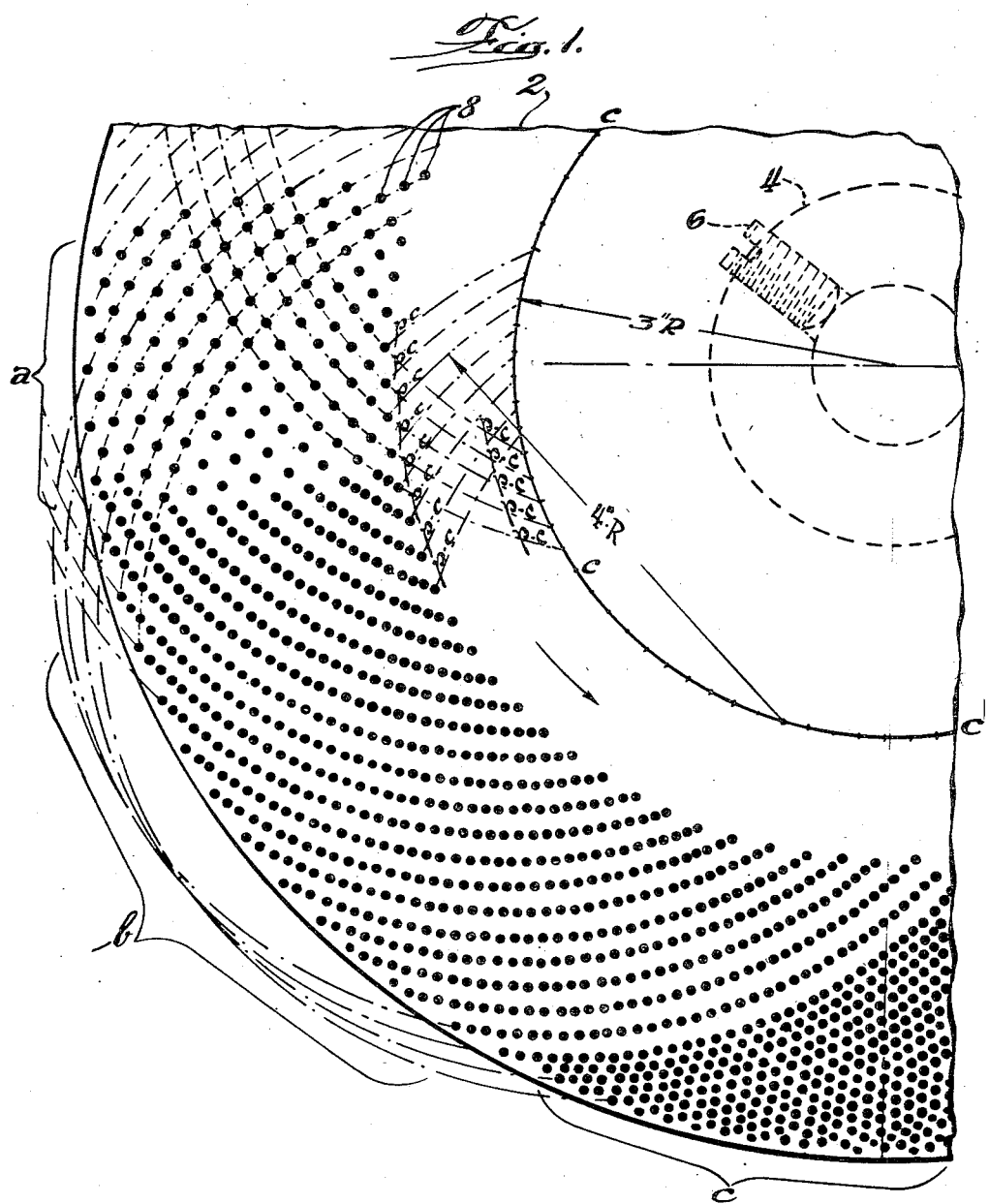
Fig. 1 is a front elevation of part of an abrasive tool made according to this invention. (Different portions of the drawing show means for achieving different densities of abrasive particles in the finished tool.)

Referring to Fig. 1, there is shown a metal backing plate 2 having a hub portion 4 and a set-screw 6 for fastening it to a grinding spindle.

On the backing plate 2, as shown, there are abrasive elements 8 arranged in a geometric pattern. These elements may consist of single abrasive grains or particles, such as diamond borts, or they may consist of clusters of smaller particles, as shown in more detail in Fig. 6 or Fig. 14. The elements may be round, as shown, or they may be of any desired shape, including curvilinear shapes extending all across the working surface of the tool.

The determination of the pattern or arrangement of the elements will depend on a number of factors.

One of these is finish. If a smooth finish is desired, then the pattern as it passes over the work should not produce score lines, and, collectively, all the elements 8 should not fall one directly behind the other (in the sense of rotation), but should be so arranged that each cluster is a little displaced from the one preceding it so that the path of each element overlaps the path of another. This may be better understood by considering that in order to produce a lined satin finish the elements will be arranged so that the overlapping is deliberately minimized.

Another important consideration is cutting speed. It is known that in a conventional, randomly oriented grinding wheel the removal rate is more rapid on a workpiece of small section than on one of larger section, even when the unit pressure is the same on each. That is, if a workpiece ¼" square in section is pushed against a moving grinding wheel with a force of, say 10 pounds, it may be ground away at a rate of, perhaps, ¹⁄₁₆" per minute. But if a workpiece 1" square is pushed against the same moving grinding wheel even with a force 16 times as great (because its sectional area is 16 times as great), it will not be ground away at the same rate of ¹⁄₁₆" per minute but at some lesser rate.

Theories have been propounded to explain this phenomenon. One surmise is that, as any abrasive grain or particle advances across a large workpiece, it gathers ahead of itself some of the material it has removed, and, if this material is not washed away or disposed of, it will reduce the abrasive effectiveness of that grain during the latter part of its passage across a large workpiece. In a random arrangement of particles, some of them may be grouped together to trap the removed material or, at best, to offer a tortuous and uncertain path for escape. This surmise is partially supported by the fact that a workpiece which is rectangular in section will be ground more rapidly (with equal grinding pressure) when it is held with its long axis perpendicular to the direction of motion of the grinding wheel than when the long axis is substantially parallel to the direction of motion.

But whether this surmise be true or false, when a pattern is used in which attention is given to the removal of waste material or detritus, an improved result is obtained.

The considerations here are that each element in the pattern should be small, preferably not more than ¼" in at least one dimension; that the open channels be at least as large as the elements themselves; and that the open channels lead in a direction approximately in a general way the free path which a drop of liquid takes as the composite result of the motion of the wheel or other tool and the holding effect of the workpiece and other frictional factors.

Another useful factor is to shape the abrasive elements themselves in such a way that they tend to plow the detritus to one side (or both sides) instead of piling it up against a frontal edge. Thus, if square-shaped elements are used, all of them should be disposed so that corners of the squares rather than sides advance toward the work. Round, diamond-shaped, triangular or hexagonal elements may also be used satisfactorily. Indeed, it is not the shape but the inclination of the advancing edge away from perpendicular to the line of advance to give a shearing action which is important. Where the motion of the tool is rotary and where the working surface is frontal rather than peripheral, then it is desirable that the angle of the advancing edge should tend to throw at least a portion of the detritus outwardly in the same direction as the centrifugal force tends.

Where the abrasive tool is to be used in electrolytic grinding, as disclosed, for example, in my co-pending application, Serial No. 310,244, filed September 18, 1952, for "Method and Apparatus for Electrolytic Cutting, Shaping and Grinding," another consideration is to provide an easy flow for electrolyte, and for this purpose cross paths may also be helpful.

Another important consideration in selection of pattern of arrangement is that the number of elements should be greatest where the wear is greatest. Thus, in a grinding wheel as shown in Fig. 1, the greatest number of particles should be located near the outer limits of the annular area constituting the working surface of the wheel. This is where greatest wear occurs due to highest velocity. When the workpiece travels (relatively to the wheel) all the way off both inner and outer limits of the working surface at each pass, with an advance toward the wheel with each pass, then there should be an increased number of elements both toward the inner and outer limits of the working area.

The geometric pattern shown in Fig. 1 meets many of these considerations in a favorable manner, although other patterns will also do so, and although for different kinds of work different patterns will be chosen to emphasize some one or two factors even at the expense of others.

In Fig. 1, the grinding wheel shown by way of example has a diameter of 13 inches. The working surface extends inwardly 2½ inches, so that its inner diameter is 8 inches. The abrasive elements 8 are round and have a diameter of a little less than 1/16 inch. In the form shown here, it is intended that each abrasive element consist of a plurality of abrasive particles, as shown in Figs. 6 and 14. Where the elements are of the order of 1/16 inch in diameter, as in Fig. 1, there may be as many as eight or ten or even more abrasive particles in each element, depending on the grit size used. In some cases, however, the elements 8 may be small, and only one grain will be used in each element. For example, the elements may be .014 inch in diameter and with particles of grit size from 60 to 80 then only one particle will be present in each element.

The abrasive elements 8 are disposed in a geometric pattern arrived at in the following way. A circle of centers c-c-c having a radius of 3 inches is drawn from the center of the wheel. The circle of centers is then divided into an integral or whole number of parts to establish centers for the pattern circles designated p-c. These centers are spaced about 7/32 of an inch apart, but what is important is that the divisions be uniform all around the circle of centers. Thus, the distance between centers may be adjusted slightly as necessary (as by stepping off with dividers), so that even divisions occur.

The pattern circles p-c intersect at numerous points, and all the points within the working area serve as centers for the abrasive elements 8. This is represented in sector marked "a" of Fig. 1.

If additional coverage is desired, then the number of elements may be doubled, as illustrated in sector "b." Additional pattern circles are drawn from centers on the circle of centers c-c-c, which are mid-way between the centers used for the pattern in sector "a." Since each pattern circle intercepts the working area twice, the result is to quadruple the number of intersections, but only half of this quadrupled number is used in sector "b" as abrasive elements 8 are placed only on alternate intersections of the ingoing cycle of each circle (taken always in the same sense).

In sector "c" all of the intersections of all of the pattern circles are used, so that in this sector there are twice as many elements per unit area as in sector "b" and four times as many as in sector "a."

It should be understood that each sector represents a possible pattern to be carried over the entire working surface of any given wheel, and that the showing of the three sectors in one figure is merely for convenience in illustration.

It will be observed, however, that in all sectors certain desirable pattern characteristics are obtained.

First it will be observed that, viewed in the direction of rotation of the wheel, any given point on a workpiece will be traversed by as many elements regardless of whether the workpiece is placed near the inner or outer limit of the working area. This result could be obtained, of course, by a pattern formed by the intersections of evenly spaced radii with a number of evenly spaced concentric circles. However, the higher speed of the elements near the periphery would cause more wear on them. Thus, it would be preferable to bring the concentric circles closer together as they approached the periphery in order to offset this tendency to wear. While such a pattern would be quite satisfactory over a narrow-band working area, the result in a normal-width working area would be to open up near the periphery a considerable space between elements viewed in the direction of rotation and, at the same time, to close up the space between elements viewed radially. Thus, the larger area near the periphery would be used less effectively than optimum. Or if it is used with an optimum arrangement, then the inner area would be less well used.

Referring back to Fig. 1, it will be seen that while any point on a workpiece will be traversed by the same number of elements, the actual number of elements near the periphery is much greater than the number at the middle or inner portion of working area. This is because of the pattern of intersections. It will be observed, also, that the density of elements (as distinguished from the number) is greater near the inner and outer edges of the working surface, thus resisting wear at these points.

Here it should be pointed out that the principle of the pattern is not confined to greater density near the inner and outer edges of a working area, but is directed to using greater concentration wherever greatest wear occurs. Thus, if the working surface of the wheel is not flat, as in the wheel of Fig. 1, but if it is contoured upwardly at some mid-portion for form grinding, then a pattern will be selected to put a greater density on the high area, for in such a situation the workpiece will be advanced frontally and will cause more wear on the high point.

So much for the distribution of elements with regard to wear. It will be observed also, particularly in sector "b" of Fig. 1, that open channels for removal of detritus are formed and that they follow approximately the path which is taken by a drop of liquid introduced onto the moving wheel. This I have determined by experiment. Since grinding wheels are customarily used with coolant, electrolyte, or other liquid, these channels serve to facilitate its flow, thus aiding in washing away the detritus. What is important here is not that the channels follow exactly the path the liquid would naturally take (which in any case will vary with its mode, direction and velocity of application), but that relatively unobstructed channels be open to the fluid in its generally outward travel. Thus, a pattern of elements closely spaced in concentric circles so that little flow between the elements is possible will be undesirable.

It is also desirable to provide cross channels to agitate the fluid, to produce turbulence and to assist in carrying away the detritus without pile-up. This is particularly desirable where the wheel is to be used in electrolytic grinding. It will be observed that the channels defined by the contiguous spaces between the elements constitute two sets of cross channels, one set following the liquid-drop path resulting from one direction of rotation, and the other following that resulting from opposite rotation. The cross channels can be observed most readily by holding the lower, right-hand corner of the drawing close to the eye with the drawing nearly parallel to the line of sight. For sector "b" the larger open channels follow the liquid-drop path resulting from rotation in the direction of the arrow.

Figure 2:
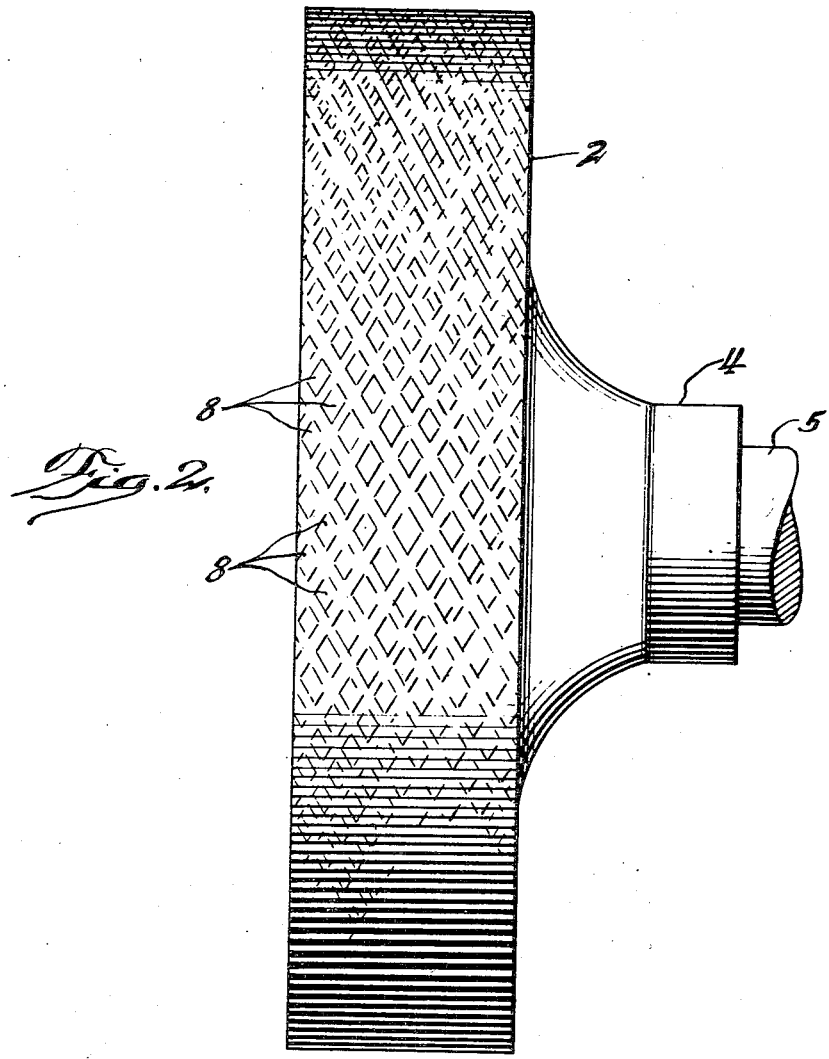
Fig. 2 shows a side elevation of a finished abrasive tool of the peripheral-working-surface type made according to this invention.

Fig. 2 illustrates a simple form of peripheral grinding wheel having a plate section 2 and a hub 4 by which it is mounted on shaft 5. The abrasive elements 8 are diamond-shaped. While the drawing shows the diamond-shaped elements as quite large, it will ordinarily be preferable to use a dimension in the long axis of the order of .015 inch and in the short axis of the order of .006 inch. Whatever the dimensions used, the width of the channels between elements 8 should be not less than the small dimension of the elements themselves and, preferably, at least as great as the large dimension of the elements.

Fig. 3 is a perspective view of a honing tool. The body 32 carries a metal bond 34 in which are imbedded abrasive particles 36, which are preferably individual grains, each of which protrudes a determinate distance above the metal bond 34.

Fig. 3–A is a fragmentary sectional view along the plane 3a—3a of Fig. 3. The particles 36 are preferably diamond borts and, as here shown, are intended to protrude .003 inch above the metal bond 34.

The pattern of particles is a rectilinear one, but it is intended that the hone be used inside a cylindrical surface and moved longitudinally of the cylinder while rotated relative to it, thus following a generally helical path. The particles 36 serve to score the cylinder wall with score marks nearly .003 inch deep. The hone may then be operated with the longitudinal motion reversed as respects the rotary motion, thus producing a cross pattern of fine score marks of determinate depth, spacing and pattern. This will be useful in the treatment of cylinder walls which have been plated with chromium or other hard material in establishing a fine network of score marks to aid in lubrication. The treatment of cylinder walls in this way is no part of this invention, which is confined to abrasive tools (including the honing tool) and means of making them.

Any of the abrasive tools above described may be made by hand, placing each abrasive particle in its appropriate position in the desired pattern into a matrix or bond, which is soft at the time of placement and susceptible of being hardened thereafter. Such a procedure may be satisfactory for the making of one or two abrasive tools for some special application, particularly if the tools are quite small. But if the patterned abrasive tool is of the size used in many industrial applications and if more than one or two are to be made, then it will be desirable to provide more rapid production techniques for making such tools.

In Figs. 4, 5 and 6 and Figs. 9 to 14, inclusive, steps in methods for rapid production of such tools are shown. The gist of the method is the formation of a pattern of adhesive imprinted in such a way as to hold abrasive particles in the desired configuration until a heavier and stronger bond of metal may be built around the particles.

Referring to Fig. 4, a section of a backing wheel 2 is shown. Upon the working surface of the backing wheel are printed the elements 8a of a desired pattern. These elements are printed in adhesive of a kind susceptible of being heat cured at a later step in the process, so as to aid in the formation of a suitable bond for holding the particles in position.

The placement of the pattern of adhesive may be carried out in several ways. It may, of course, be done by hand, but it is preferred to establish the pattern on a rubber stamp, which will have on it all of the elements of the pattern, which will then be covered lightly with the adhesive and pressed against backing plate 2, thereby leaving very thin layers of activated plastic adhesive at the points where each abrasive element 8 is to be located.

The rubber-stamp technique is desirable because the desired pattern may be drawn with pen and ink (as shown, for example, in Fig. 1 hereof). The pattern thus produced by pen and ink may be reproduced in a rubber stamp by any of the several available photoengraving techniques which are used in making rubber stamps bearing signatures or other patterns for a multitude of uses.

In imprinting the pattern with the rubber stamp, precaution must be taken that the stamp is located accurately on the backing plate and that the rubber stamp is not pressed too hard, for if it is, the pattern elements in the stamp may spread in an uneven and undesired way.

While the rubber-stamp technique will be desirable for complicated patterns, it is also possible to achieve the desired result in simpler patterns (e. g., as in Fig. 2) by use of a knurled roll, which may be of brass and which can be used to imprint the pattern shown in Fig. 2 hereof on the periphery of the grinding wheel shown there. Where the knurled roll is used, it will be desirable to provide continuous feeding means so that uniform thickness of adhesive will be imprinted onto the backing plate.

As adhesive, a number of materials may be used satisfactorily. Good results have been obtained with a material known as "Alradite," produced by Ciba and Company. This material is one of the ethoxylenes, which are condensed products of polyarylithylene oxide compounds with acids and hydrates, amines and other compounds. The advantage of this type of material is that during curing it produces little or no water or other volatile material.

The plastic adhesive should be applied quite thin for easy printing of the pattern, and, if the above-identified plastic is used for this purpose, it will be diluted with toluol.

After the plastic adhesive pattern has been imprinted on the backing plate, it is allowed to dry, so that some of the solvent passes off. This process may be accelerated by heating, but the heating should not proceed far enough as to cause permanent hardening or curing of the plastic.

After the adhesive has dried sufficiently to become tacky, diamond bort or other abrasive particles 10 are spread over the patterned surface, with the result that particles will adhere to the portions where the adhesive pattern has been imprinted, as shown in Fig. 5. If the elements of the pattern are large with respect to the particle size, then a number of particles will adhere to each element. But if the particles are large enough with respect to the size of the elements, then only one particle will adhere to each element. Thus, for example, if the element is circular in shape and has a diameter of .014 inch, and if the abrasive particles are of 60 to 80 grit size, then there will be room for only one grain on each dot or element.

After the particles have been spread in an excessive quantity across the surface to cover it, giving opportunity for the particles to adhere to the adhesive, then the remainder of the particles are brushed or blown off.

At this stage the sectional view of Fig. 5 indicates the abrasive particles 10 adhering to plastic adhesive elements 8a.

Thereupon, the surface of the backing plate 2 is prepared for electroplating. If heat has been used to drive off the volatile solvent from the adhesive, then it may be necessary to pickle the surface of the backing plate 2 in order to free it of oxides or scale. When this has been done, the entire backing plate 2, with the adhesive elements 8a and the abrasive particles 10 in position, is electroplated. Usually, it will be desirable to mask the non-working surfaces of the backing plate in order that electrodeposition of metal may be confined to the working area. Referring to Fig. 6, the metal deposit 12 may be copper, nickel, iron or a combination of these may be used for good adherence and the desired degree of firmness in holding the abrasive particles. The electrodeposition will be carried forward until somewhat more than half of the depth of the abrasive particles is reached. It should be noted that the adhesive used is thin enough, and its insulating qualities poor enough, so that metal is deposited right over and through the adhesive elements 8a as well as directly to the metal of the backing plate 2. By this means, very close holding of the abrasive particles 10 is obtained.

After the plating is complete, the entire assembly is heated to a high enough temperature to set the adhesive so that it becomes a permanent plastic having considerable strength. Thus, the plastic aids permanently in holding the abrasive particles in place. If desired, the curing may be carried out prior to the electroplating, in which case, however, special care must be taken to clean the metal of scale and oxides before plating.

It will be noted that the same technique may be used for making abrasive tools without having a patterned arrangement of abrasive elements or particles. As shown in Figs. 7 and 8, the entire surface of a backing wheel may be coated with plastic adhesive 7 and abrasive particles 10 distributed over it in any desired manner. For example, the distribution may be achieved by mixing the particles with some soluble or otherwise removable particles, which are then dissolved or otherwise removed, as disclosed in my co-pending application, Serial No. 314,881, filed October 15, 1952, now Patent No. 2,785,060, for "Method of Distributing Particles and Abrasive Article."

The same steps are then followed as have been described above in connection with the patterned tool, but in this instance all of the plating will be carried on through the plastic adhesive. It has been found that this can be done effectively if the plastic adhesive is very thin. After the plating has been completed, the assembly is heated to set and cure the plastic adhesive so that its bond becomes strong and permanent.

A variant of this procedure is shown in Figs. 15, 16 and 17. The abrasive particles 10 are first completely covered by a thin layer of plastic adhesive 9 diluted with a suitable solvent. The coating may be accomplished simply by immersing the particles in the plastic or it may be accomplished by blowing the particles through a spray of the plastic. If desired, electrostatic means may be used in this latter procedure to maximize the impingement of plastic adhesive on the abrasive particles.

After the plastic adhesive 9 has been applied to the particles 10, they are dried, preferably with application of moderate heat sufficient to drive off the solvent but not sufficient to set the plastic. The result of drying is that the particles cohere one to another to form clusters, and it is necessary then to run them in a ball mill in order to break up the clusters into individual particles, each coated with a thin layer of activated plastic adhesive. The coated particles are shown in Fig. 15.

The particles are then distributed over the surface of backing plate 2 in any desired manner. If desired, the backing plate may be inscribed with grooves to establish a desired pattern into which the particles will fall. The entire backing plate 2, together with the adhesive-coated particles 10, is then heated. As this is done, the plastic adhesive will first soften and become tacky and adherent, and will then set and cure as a hard and strong material. This stage is shown in Fig. 16.

The metal surface of the backing plate 2 is then cleaned to remove oxides or scale, and then, as shown in Fig. 17, metal 12 is deposited electrolytically to surround and hold the abrasive particles. By this means, the abrasive particles or grains are held both by a plastic envelope around each particle and a metal bond outside the plastic envelope. The plastic is somewhat softer than the metal, and for some kinds of service this is advantageous in that shock against the particles, which tends to break or crush them or loosen them from their bond, is cushioned slightly by the plastic envelope.

If desired, the metal 12 may be applied before the plastic 9 has been set. This requires some care in handling to avoid spilling the particles 10 of the backing plate 2, but it may be done by keeping the backing plate substantially horizontal and avoiding sudden movement. Then, after the metal 12 has been deposited, the entire assembly is heated to set and cure the plastic 9, providing thus a firm and close-fitting bond as the plastic first softens and flows slightly before hardening.

The general method thus described, characterized by the use of both plastic and metal bond, constitutes a way of making either a patterned or a randomly oriented abrasive tool at low cost. For many applications, such an abrasive tool will be entirely satisfactory, but for some applications it will be desirable to control more accurately the amount of protrusion of the abrasive grains or particles above the bond than is achieved in the method previously described, for in that method, since the grains will not be identical in size, it follows that the larger grains will protrude somewhat higher than the smaller ones. If it is desired to assure that the outermost points or surfaces of the grains lie in one plane, which may be desirable, for example, in electrolytic grinding as disclosed in my co-pending application, Serial No. 310,244, filed September 18, 1952, for "Method and Apparatus for Electrolytic Cutting, Shaping and Grinding," then the method shown in Figs. 9 to 14, inclusive, should be employed.

The method about to be described constitutes an advance over the method disclosed in my Patent No. 2,368,473, issued January 30, 1945, for "Method of Making Abrasive Articles." Here again, the crux of the method is the initial imprinting of the desired pattern of elements with an adhesive to hold the abrasive particles or grains in the desired arrangement. However, as indicated in Fig. 9, the adhesive elements 8a are not imprinted on a backing plate but on a blank 3, which may be flat or contoured, as desired. The blank 3 is used in the process of manufacture but forms no permanent part of the abrasive tool. The adhesive elements 8a are imprinted onto the blank by any of the techniques heretofore described. The adhesive layer should be very thin, so thin indeed that it has not been possible to measure it by any ordinary mechanical measuring technique.

The abrasive particles 10 are then scattered over the surface of the blank so that they adhere to the adhesive elements 8a. Ordinarily, no effort will be made to separate or distribute the particles 10 over the surface of the elements 8a, but, if desired, the abrasive particles may be mixed with salt, as disclosed in my co-pending application, Serial No. 314,881, filed October 15, 1952, for "Method of Distributing Particles and Abrasive Article."

Or, if desired, the elements 8a may be small enough so that each will hold only one abrasive grain or particle 10. In any case, only one layer of particles 10 will adhere to each element 8a. This is assured by holding the thickness of the adhesive to a very small dimension.

The excess particles are brushed off or otherwise removed from the blank. This stage is shown in Fig. 10. Thereupon metal 12 is electrolytically deposited on the blank 3, some of it being deposited through the adhesive so that a close and tight bond is achieved around the particles and through the interstices between them, as shown in Fig. 11. The initial deposit of metal may be of copper 12c and will be of the same thickness as is desired ultimately to be the amount of protrusion of the particles 10 in the tool. Thus, for example, in making the hone shown in Fig. 3, the metal deposited at this stage of the operation will be .003" thick.

After the initial layer of copper or similar metal has been deposited, there is then deposited a thicker layer of nickel or iron 12n to completely cover the particles 10.

Thereupon, the electrodeposited metal is all removed from the blank 3, as shown in Fig. 12, and is soldered or otherwise permanently fastened to a backing plate 2, as shown in Fig. 13. Thereupon the layer of copper 12c is etched away, leaving the abrasive particles 10 protruding from the metal bond, as shown in Fig. 14.

It should be noted that the blank 3 should have a surface to which the electrodeposited material will not easily adhere, so that the separation can be easily accomplished. There are many ways of bringing this about. One easy way is to use a very thin film of oil, wax or graphite on the blank before beginning any other operation on it. The film should be so thin that it will offer little or no resistance to the pasage of current for electroplating but will still prevent a formation of a solid or permanent bond between the electroplated material and the blank. It should also be noted that, if desired, the backing plate 2 may be affixed to the electrodeposited nickel or iron 12n prior to removing the electrodeposited material from the blank 3. When the electrodeposited material is to be affixed to the backing plate 2, it will usually be necessary first to grind the back surface of the electrodeposited material in order to have it smooth and even.

A preferred method of forming a desired pattern is illustrated in Figs. 18 to 20, inclusive.

In general, this method consists in making a screen or stencil through which abrasive particles are deposited on an adhesive-coated surface of an electroplating blank or of a grinding tool itself. Ordinarily, it is preferable to bring about this deposition by electrostatic means.

Referring to Fig. 18, a blank 3 in the form of a ring is first coated with a very thin layer of adhesive 8. This covers the entire working surface, no effort being made to establish a pattern at this stage. This is done before the blank 3 is assembled into the complete apparatus of Fig. 18. The blank 3 is then mounted in a mounting ring 41, which is made of an insulating material such as Lucite. The blank 3 fits closely but not tightly in mounting ring 41 and is clamped by thumb screw 43. The lower surfaces of blank 3 and mounting ring 41 (as shown in Fig. 18) should be flush, and thumb screw 43 will be tightened when this relationship is achieved.

This assembly of blank 3 and mounting ring 41 is also carried out before they are mounted in the complete apparatus of Fig. 18.

This apparatus provides an insulating frame for holding abrasive particles 10, pattern screens 45 and 45a, and blank 3 in proper relationship to permit electrostatic deposition of the particles on blank 3.

An annular base member 47 of insulating material is recessed to provide a receptacle for an annular metal tray 49 in which the particles 10 are placed. The tray 49 may be trough-like in section or, as shown, it may have a number of recesses 51 drilled into it. The advantage of the recesses is that they form a number of pockets which may be readily filled by dusting the abrasive powder through a sieve and may then be leveled off by wiping the excess powder away. Diamond powder of grit size from 200 to 400 mesh has proven very satisfactory. Indeed, one of the surprising aspects of the invention is that this relatively fine abrasive yields cutting speeds more like those normally expected only with much coarser grains while, at the same time, giving a fine finish in a single operation. Larger grit size up to 80 mesh may also be used, but the invention is concerned with using abrasive powders rather than with using individual cutting stones susceptible of being practically handled piece by piece.

It is desirable in many instances to mix the abrasive particles 10 with another powder of soluble material, such as sodium sulphate, so that initial spacing between the abrasive particles will be brought about. At a later stage in the process, the salt is dissolved away, thus bringing about a separation of the abrasive particles. The use of the salt-dissolution method is fully disclosed in my co-pending application, Serial No. 314,881, filed October 15, 1952, for "Method of Distributing Particles and Abrasive Article."

It is preferred to make the mixture of about 35% diamond powder and about 65% soluble salt, so that when the salt is dissolved away, the diamond density is about ⅓ what it would be if no salt were used. The patterns used preferably result in open spaces on the grinding tool of ½ or more of the total area. Since each abrasive element of the pattern contains only ⅓ the maximum possible amount of diamond powder, it follows that the tool as a whole has only ⅙ or less of the maximum possible number of diamond particles. This appears to be of great advantage in increasing the cutting speed and, indeed, a total coverage even less than this (for example, that obtained with the cross pattern illustrated in Fig. 20) gives higher cutting speed.

A fixed center plug 53, made of insulating material and having a center bore 55, fits closely within base member 47 and rises to a height flush with the upper surface of base member 47. This surface is approximately half an inch above the surface of tray 49. This is substantially the distance the particles 10 have to move under the influence of the electrostatic field, and this distance is satisfactory for particles from 200 to 400 grit size. If larger particles are used, the distance may be narrowed by raising the tray 49, or the potential of the electrostatic field may be increased.

The fixed center plug is removable for cleaning purposes but normally remains fixed within base member 47.

The tray 49 is set in place in the recess of base member 47 and is loaded with the mixture of abrasive powder (usually diamond bort) and salt. A connector screw 57 threaded through base member 47 is then screwed down to make electrical contact with tray 49, and connector nuts 59 are tightened over lug connector 61 so as to make connection to a high-tension lead 63.

Next, pattern screens 45 and 45a are laid across the upper surfaces of base member 47 and center plug 53.

These pattern screens are shown in Figs. 19 and 20. Fig. 19 shows screen 45, which is made of brass of .010" thickness. The curved slots shown in white conform to the pattern principles previously described and are cut through the brass by an engraving lathe. Screen 45a is the same as screen 45 except that it is made of much thinner stock, usually about .003". It is possible to use screen 45 alone, producing a pattern conforming to the curved slots. Often, however, it will be preferable to produce a pattern of smaller individual abrasive elements, and this may be done by placing screen 45a on top of screen 45 but in the reverse sense so that its slots cross those of screen 45. When this is done, a pattern appears like that illustrated in Fig. 20, which is a retouched photograph taken of the two screens laid together against a light background with screen 45a on top and screen 45 beneath.

As a practical matter, it has proven desirable to use slots in the lower screen, e. g. screen 45, which are narrower than those used in upper screen 45a. This is because even when screen 45a is made of stock which is as thin as is practicable, there is still some diffusion of the pattern cast by screen 45. The result is that as the particles pass on through the slot openings in screen 45, they spread one from another even in a very short path. The amount of spreading from the slots in screen 45a being closer to the adhesive is considerably less, so that the particle-bearing abrasive elements are considerably longer in one dimension than in the other. By using slots in screen 45 which are approximately ½ as wide as those in screen 45a, the pattern of particles cast by screen 45 will be approximately the same as that cast by screen 45a, and the result will be the production of a cross-pattern of substantial symmetry.

The relative size of slots in the two screens will be varied in accordance with the absolute size of the slots, with the thickness of screen 45a, with the distance of screen 45a from the adhesive layer on the electroplating blank, and, of course, with the nature of the pattern desired. Assuming that a symmetrical pattern is desired, the wider the slot openings the less relative difference in their width there will need to be. The thinner screen 45a is, the more nearly alike the slots in the two screens may be. Similarly, the farther the adhesive layer is from screen 45a, the more nearly equal the slot openings in the two screens may be (although if there is any substantial distance between screen 45a and the adhesive layer, the pattern will be so diffused as to be unsatisfactory).

If desired, the two pattern screens 45 and 45a may be permanently fastened together; for example, by tinning one surface of screen 45 with a very thin coat of solder and then soldering it to screen 45a. In this way, each screen supports the other and minimizes the likelihood of damage in handling. It is also possible, of course, to cut the desired pattern of openings into a single screen. Other desired patterns may be produced in this way to give substantially any pattern arrangement which may be desired. Thus, circular openings may be cut into the screen in pattern arrangements like those shown in Fig. 1. Or other design patterns may be provided in similar ways.

When the two screens are placed on the base member 47, screen 45a made of the thinner stock will be placed on top toward blank 3 so that there will be a minimum distance between screen 45 and blank 3. Unless this is done; that is, if screen 45a is too thick; the pattern cast by screen 45 on the blank 3 will be diffused and not sharp.

When plating blank 3 in its mounting ring 41 is placed above screens 45 and 45a, spacing shims 65 are placed between the upper surface of base member 47 and the lower surface of mounting ring 41. These shims may be of paper or of metal shim stock and have a thickness of about .002". Their purpose is to space the adhesive-bearing surface of blank 3 away from screen 45a so that the adhesive will not be transferred to the screen.

Finally, movable centering plug 67, also of insulating material, is placed by metal handle 69 into the assembly. The plug proper fits tightly on handle 69 and the lower portion of the handle passes through center holes of screens 45 and 45a, and thence into bore 55 of center plug 53. By this means, all of the working components are centered and brought into proper lateral relationship.

A high voltage source is now connected (with the source "off," of course). The lead 63 is connected more or less permanently to connector screw 57. Another lead 63a is connected by Fahnestock clip 71 to thumb screw 43. The voltage source should provide about 10,000 volts and may consist of a vacuum tube rectifier system or any other suitable supply.

Once the connections are made, the source is turned "on" momentarily. The particles 10 will thus jump upwardly, and some will pass through the openings in pattern screens 45 and 45a and onto the adhesive on blank 3, where they will be held. In this way the particles will be placed on the blank in a pattern determined by the screens.

The effect of the electrostatic deposition is to orient the particles so that their long axes are normal to the plane of the working surface of blank 3. Abrasive particles, such as diamond bort, are ordinarily irregular in shape, and the long axis refers to whatever dimension across the particle is the longest. With most diamond particles the crystalline structure is such that the longer and shorter dimensions are readily seen in a microscope.

In any situation where the orientation of the particles is not important, it will be possible to deposit the particles through the screens onto the blank by placing the blank with its working face up, then placing the screens over the blank, and then sifting abrasive powder onto the blank through the screens.

After the particles 10 have been deposited, as described, on the adhesive 8 of plating blank 3, the blank in its mounting ring 41 is removed from the apparatus and the blank is then taken from the mounting ring.

The adhesive is allowed to set and the blank is then immersed in water to dissolve away the salt particles. At this time, there will be on the working surface of plating blank 3 a plurality of abrasive elements, each consisting of a number of abrasive particles, each particle separated slightly from the next by the spaces formerly occupied by the salt particles.

The non-working surfaces of the blank are then covered or masked with insulating plastic material. This may be done by immersing the blank in a hot plastic material while keeping the working surface covered. The plastic adheres to the blank and prevents the deposition of metal except on the working surface in the plating steps which follow. The blank 3 is then immersed in an electroplating bath to deposit a thin layer of copper, and then in another bath to deposit a heavier layer of nickel or similar material. The ring of electrodeposited metal is then stripped away from the blank and carries the abrasive particles in it. The blank is stripped of the plastic material and is cleaned, and is then ready for use again. The copper deposit is then chemically removed from the nickel or other material, leaving the abrasive particles protruding by the thickness of the removed copper layer, and leaving the extremities of the particles all in substantially the same plane. This part of the process is disclosed in my prior Patent No. 2,368,473, issued January 30, 1945, for "Method of Making Abrasive Articles."

The grinding tools made in accordance with this invention in which diamond particles are arranged in a desirable cutting pattern in low density of coverage and are oriented so that their long axes are normal to the working surface bring about a most surprising and dramatic increase in cutting speed. For example, diamond grinding wheels made in accordance with this invention and utilizing the general type of pattern here disclosed show cutting speeds almost twice as great as those obtained with comparable, conventional metal-bonded diamond grinding wheels. At the same time, a cost saving results because fewer diamond particles are used due to the fact that so large a portion of the total working area is left open. It is believed that some of the increase in cutting speed may arise from the very fact that fewer diamond particles are used, with the result that there is a higher unit pressure of the workpiece against all of them. It is very difficult or impossible, however, to achieve this result if the effort is made to distribute an equally small number of particles purely at random, for when the total number of particles is small, the likelihood of great unevenness in random distribution becomes quite serious, and prevents achievement of an optimum result.

The method disclosed here in which pattern screens are used permits a wide variation in pattern design. It permits the repeated use of the pattern screen for production of large numbers of grinding tools and it assures that the pattern is uniform throughout each tool and from one tool to the next.

There is one other aspect of the use of a pattern in an abrasive tool which is quite unrelated to utility. There are some applications for abrasive tools in which, within certain broad limits, the pattern is not of any serious importance in the usability of the tool. This will be particularly so in abrasive tools used in small shops for a wide variety of purposes, and where the utmost in economy, cutting speed, finish, etc. are not of great importance. For sale to such users, the artistic effect of the pattern may be of as great commercial importance as its direct utility, and the methods which have been described will be of considerable value in permitting the use of patterns of wide variety aimed at producing a pleasing appearance rather than at utility.

It will be seen that by this invention abrasive tools are provided having determinate arrangements of the abrasive particles in them, so that optimum utilization of the particles may be made or so that a pleasing artistic appearance may be obtained. It will be seen also that inexpensive methods of making abrasive tools, either of the patterned type or of the randomly oriented type, are disclosed and, also, that a method is disclosed for making a patterned type abrasive tool in which the advantage of uniformity in protrusion, as disclosed in my Patent No. 2,368,473, is attained.

While a preferred embodiment of this invention has been shown and described, it will be apparent that numerous modifications and variations thereof may be made without departing from underlying principles of the invention. It is therefore desired by the following claims to include within the scope of the invention all such variations and modifications by which substantially the results of this invention may be obtained through the use of substantially the same or equivalent means.

What I claim as new and desire to secure by Letters Patent is:

1. In the process of making a metal-bonded abrasive tool having a precise determinate pattern of clusters of abrasive particles forming the working surface of the tool, the steps which include coating a tool blank with a thin layer of adhesive, placing a first pattern screen having slotted openings therein in close proximity to and not more than .005" from the tool blank, placing over the first pattern screen a second pattern screen having slotted openings arranged to cross the slotted openings of the first pattern screen thereby to establish a pattern of openings at the intersections of the slotted openings of the two pattern screens, then propelling abrasive particles by electrostatic means through the pattern of openings formed by the two pattern screens and onto the adhesive on the tool blank, then depositing metal onto the tool blank to surround and support the abrasive particles and then separating the tool blank away from the deposited metal and the abrasive held therein.

2. The method defined in claim 1 in which the slotted openings in the second pattern screen are made narrower than the slotted openings in the first pattern screen.

References Cited in the file of this patent

UNITED STATES PATENTS

| | | |
|---|---|---|
| 794,495 | Gorton | July 11, 1905 |
| 794,496 | Gorton | July 11, 1905 |
| 1,414,447 | Tone | May 2, 1922 |
| 1,988,065 | Wooddell | Jan. 15, 1935 |
| 2,152,077 | Meston et al. | Mar. 28, 1939 |
| 2,359,920 | Keeleric | Oct. 10, 1944 |
| 2,367,286 | Keeleric | Jan. 16, 1945 |
| 2,368,473 | Keeleric | Jan. 30, 1945 |
| 2,376,342 | Carlton | May 22, 1945 |
| 2,378,025 | Melton et al. | June 12, 1945 |
| 2,386,626 | Nadeau et al. | Oct. 9, 1945 |
| 2,457,156 | Jones | Dec. 28, 1948 |
| 2,463,241 | Carlton | Mar. 1, 1949 |
| 2,548,872 | Cross et al. | Apr. 17, 1951 |

OTHER REFERENCES

Phillips: "Flock Finishing," Organic Finishing, October 1952, pp. 11 to 14.